US012654945B2

(12) United States Patent
German et al.

(10) Patent No.: US 12,654,945 B2
(45) Date of Patent: Jun. 16, 2026

(54) MOTORIZED ROLLER DRIVEN TURNTABLE SORTATION CONVEYOR

(71) Applicant: Dematic Corp., Grand Rapids, MI (US)

(72) Inventors: Harry T. German, Belding, MI (US);
Tyler Ernest, Cedar Springs, MI (US);
Joseph Russell, Jenison, MI (US)

(73) Assignee: Dematic Corp., Grand Rapids, MI (US)

( * ) Notice: Subject to any disclaimer, the term of this patent is extended or adjusted under 35 U.S.C. 154(b) by 156 days.

(21) Appl. No.: 18/598,274

(22) Filed: Mar. 7, 2024

(65) Prior Publication Data

US 2024/0300744 A1     Sep. 12, 2024

Related U.S. Application Data

(60) Provisional application No. 63/488,860, filed on Mar. 7, 2023.

(51) Int. Cl.
| | |
|---|---|
| *B65G 13/10* | (2006.01) |
| *B65G 13/02* | (2006.01) |
| *B65G 47/54* | (2006.01) |
| *B65G 47/64* | (2006.01) |

(52) U.S. Cl.
CPC ............. *B65G 13/10* (2013.01); *B65G 13/02* (2013.01); *B65G 47/54* (2013.01); *B65G 47/648* (2013.01); *B65G 2812/14* (2013.01)

(58) Field of Classification Search
CPC .... B65G 13/10; B65G 13/02; B65G 2812/14; B65G 47/54; B65G 47/648
See application file for complete search history.

(56) References Cited

U.S. PATENT DOCUMENTS

| | | | | |
|---|---|---|---|---|
| 3,576,002 | A * | 4/1971 | Klingsberg .......... | C07D 339/04 |
| | | | | 549/39 |
| 4,019,627 | A * | 4/1977 | Eggert ................... | B65G 47/54 |
| | | | | 198/786 |
| 11,034,524 | B2 * | 6/2021 | Diehr ................... | B65G 41/003 |
| 12,404,110 | B2 * | 9/2025 | Zhang ................... | B65G 13/10 |
| 2008/0118337 | A1 * | 5/2008 | Vestergaard ......... | B65G 41/008 |
| | | | | 414/340 |
| 2008/0264744 | A1 * | 10/2008 | Atwater ................... | F16F 7/09 |
| | | | | 188/381 |
| 2016/0291956 | A1 * | 10/2016 | Hargreaves ........... | G06F 3/0383 |
| 2024/0002171 | A1 * | 1/2024 | Fenile .................... | B65G 47/68 |

FOREIGN PATENT DOCUMENTS

| | | | | |
|---|---|---|---|---|
| GB | 2337032 | A * | 11/1999 | ............. B65G 13/10 |

* cited by examiner

*Primary Examiner* — Mark A Deuble
(74) *Attorney, Agent, or Firm* — Gardner, Linn, Burkhart & Ondersma LLP

(57) ABSTRACT

A conveyor system includes a turntable conveyor comprising a stationary frame, a rotatable support on the stationary frame, and a drive system operable to rotate the rotatable support about a vertical axis. A circular conveying surface is supported on the rotatable support and is configured to convey articles supported thereon in a conveying direction when driven. One or more input conveyors and one or more output conveyors are positioned about the turntable conveyor. The conveying surface comprises a plurality of rollers that are rotationally driven and include a first set of rollers defining a first rotational surface and a second set of rollers defining a second rotational surface, where the conveying surface is configured to receive an article from a selected one of the inbound conveyors and to discharge the article to a selected one of the outbound conveyors.

20 Claims, 5 Drawing Sheets

MOTORIZED ROLLER DRIVEN TURNTABLE SORTATION CONVEYOR

CROSS REFERENCE TO RELATED APPLICATION

The present application claims benefit of U.S. provisional application Ser. No. 63/488,860 filed Mar. 7, 2023, which is hereby incorporated herein by reference in its entirety.

BACKGROUND AND FIELD OF THE INVENTION

The present disclosure relates to a conveyor for redirecting articles from one or more inbound conveyors to one or more outbound conveyors.

Conveyor systems may incorporate equipment for altering the direction of objects being conveyed by the systems. Such equipment includes right angle transfer devices that operate to alter the conveying direction of items by ninety degrees. Right angle transfer devices may be constructed with spaced apart rollers, where the rollers allow items to be transported along a conveyor assembly in one direction, where transfer blades may be selectively raised between the spaced apart rollers to alter the direction of conveyance of an item. For example, the transfer blades include driven belts that alter the direction an item is conveyed with respect to orientation of the spaced apart rollers

SUMMARY OF THE INVENTION

A turntable conveyor for conveying articles includes a stationary frame, a rotatable support supported by the stationary frame, a first drive system operable to rotate the rotatable support about a vertical axis relative to the stationary frame between at least a first orientation and a second orientation, and a conveying surface supported on the rotatable support. The turntable conveyor further includes a second drive system operable to drive the conveying surface to convey an article supported thereon in a conveying direction when driven. When the rotatable support is rotated to the first orientation, the conveying direction of the conveying surface forms an inbound direction for receiving an article from a first conveyor. When the rotatable support is rotated to the second orientation, the conveying direction of the conveying surface forms an outbound direction for conveying the article supported thereon to a second conveyor.

In one aspect, the first drive system is operable to rotate the rotatable support to a third orientation to form a second outbound direction or a second inbound direction.

According to another aspect, the first drive system is operable to rotate the rotatable support to a fourth orientation to form a third outbound direction or a third inbound direction.

In yet another aspect, the first drive system is operable to rotate the rotatable support to a fifth orientation to form a fourth outbound direction or a fourth outbound direction.

According to yet another aspect, the first drive system is operable to rotate the rotatable support to a sixth orientation to form a fifth outbound direction or a fifth outbound direction, and optionally further to a seventh orientation to form a sixth outbound direction or a sixth outbound direction.

In any of the above, the conveying surface comprises a plurality of rollers.

For example, the rollers may include first and second sets of rollers, with the first set of rollers forming inbound rollers when the rotatable support is in the first orientation, and the first set of rollers forming outbound rollers when the rotatable support is in the second orientation.

In a further aspect, the first and second sets of rollers are driven in opposite directions by the second drive system wherein the second set of rollers form inbound rollers when the rotatable support is in the second orientation while the first set of rollers form the outbound direction.

A conveying system is provided that includes a turntable conveyor according to any of the above turntable conveyors in combination with a first inbound conveyor that is located adjacent the turntable conveyor and operable to convey articles in the inbound direction of the turntable conveyor when the rotatable support is rotated to the first orientation.

In another form, the conveying system further includes a second outbound conveyor located adjacent the turntable conveyor, which is operable to receive articles from the outbound direction of the turntable conveyor when the rotatable support is rotated to the first or second orientation.

In another aspect, the conveyor system further includes a third conveyor located adjacent the turntable conveyor, which is operable to receive articles from or convey articles to the rotatable support when the rotatable support is rotated to the third orientation.

In further aspects, the number of orientations can be increased to fourth, fifth and sixth orientations in which the turntable conveyor is operable to receive articles from or convey articles from fourth, fifth, and sixth conveyors.

In any of the above, the conveying surface may comprise a plurality of rollers.

For example, the plurality of rollers may include first and second sets of rollers, with the first set of rollers forming inbound rollers when the rotatable support is in the first orientation, and the first set of rollers forming outbound rollers when the rotatable support is in the second orientation.

Similarly, the first and second sets of rollers may be driven in opposite directions by the second drive system wherein the second set of rollers form inbound rollers when the rotatable support is in the second orientation while the first set of rollers form the outbound direction.

In any of the above, the first drive system may comprises a motor, such as an indexing or stepper motor.

In any of the above, the second drive system may include a motor, or a motor for each roller in the case of powered rollers.

According to another embodiment, a conveyor system includes a turntable conveyor comprising a stationary frame, a rotatable support on the stationary frame, and a drive system operable to rotate the rotatable support about a vertical axis. A circular conveying surface is supported on the rotatable support and is configured to convey articles supported thereon in a conveying direction when driven. One or more input conveyors and one or more output conveyors are positioned about the turntable conveyor. The conveying surface comprises a plurality of rollers that are rotationally driven and include a first set of rollers defining a first rotational surface and a second set of rollers defining a second rotational surface, where the conveying surface is configured to receive an article from a selected one of the inbound conveyors and to discharge the article to a selected one of the outbound conveyors.

Thus, the turntable conveyor described herein can redirect one or more articles from one or more inbound conveyors to one or more outbound conveyors, and further without reorienting the article. The turntable conveyor is able to receive articles from one direction and rotate for conveying in numerous alternative directions depending on the size of the turntable conveyor and widths of the inbound and outbound conveyors disposed thereabout. The system provides significant cost savings over traditional right angle transfer devices. These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
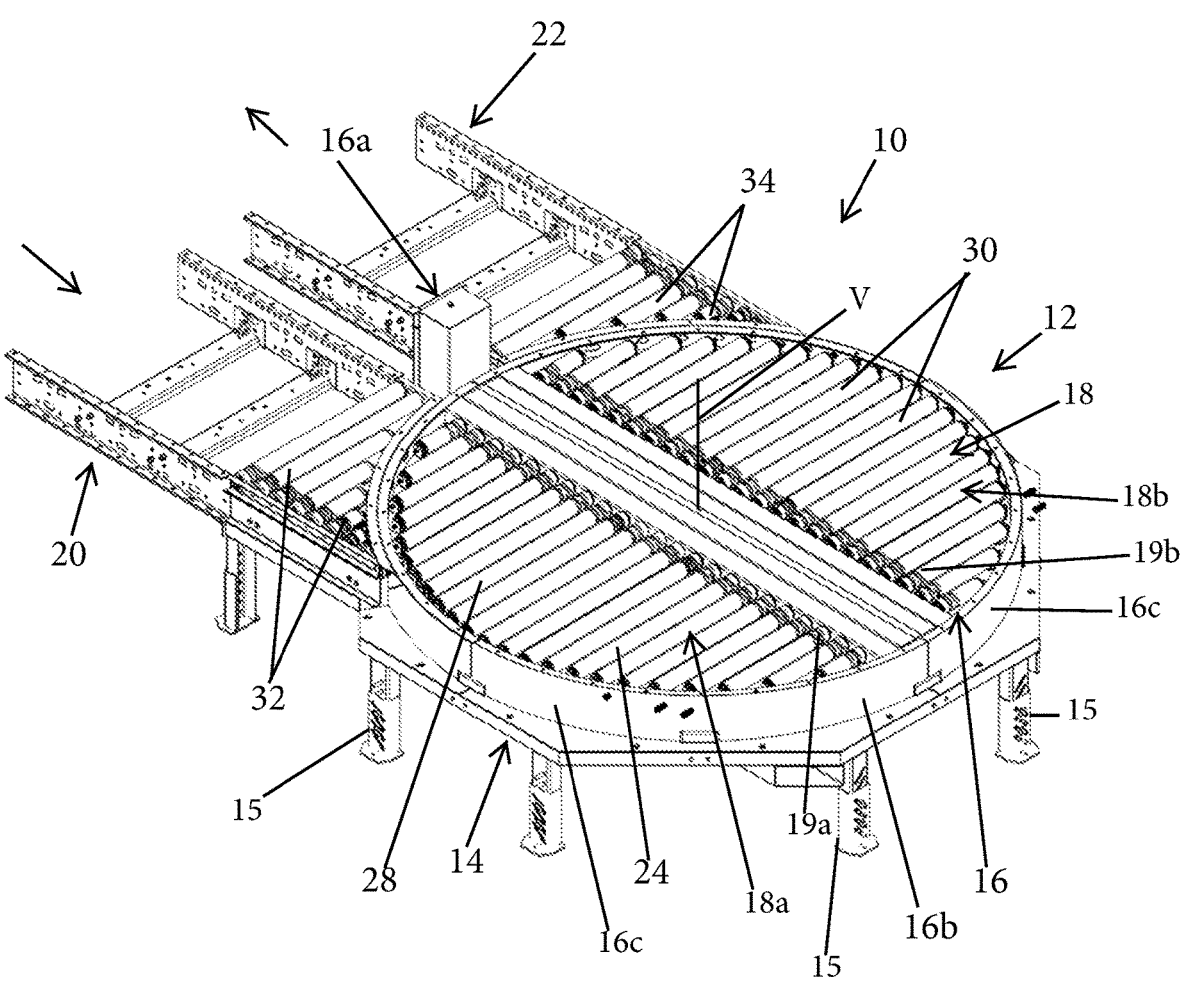
FIG. 1 is a perspective view of a conveying system of the present disclosure.

Referring to FIG. 1, the numeral 10 general designates a conveying system. As will be more fully described below, conveying system 10 includes a turntable conveyor 12 that can redirect one or more articles from one or more inbound conveyors 20 to one or more outbound conveyors 22. Further, the article(s) may be redirected without changing the orientation of the article(s). the turntable conveyor 12 may optionally be configured to be used with conventional conveyors, and, thus, no modification would be required to the inbound or outbound conveyors, or alternatively may be configured for use with specially constructed inbound and outbound conveyors. Hereinafter reference will be generally made to an article, though it should be understood that conveying system 10 may convey multiple articles at the same time.

Referring again to FIG. 1, turntable conveyor 12 may be located adjacent two or more conveyors 20, 22 and, further, instead or in addition interposed between the two or more conveyors, as will be more fully described below. In the illustrated embodiment conveyor 20 comprises an inbound conveyor on which articles are delivered to turntable conveyor 12 and conveyor 22 comprises an outbound conveyor on which articles are discharged from turntable conveyor 12. Although shown in FIGS. 1-4 as comprising a single inbound conveyor 20 and a single outbound conveyor 22, it should be appreciated that conveyor system 10 may be configured with multiple inbound and/or outbound conveyors.

Figure 4:
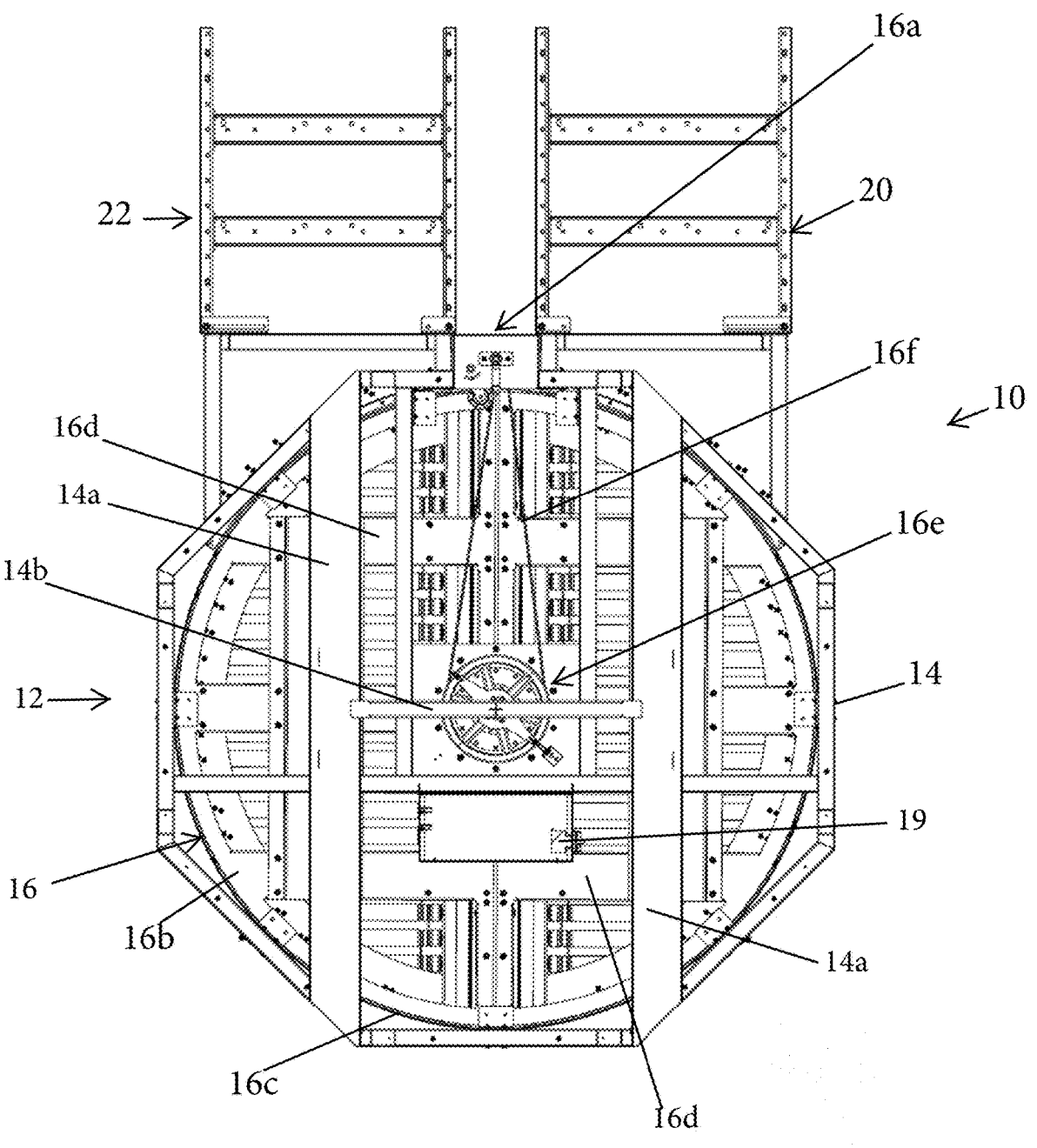
FIG. 4 is a cross-section view taken along line A-A of FIG. 3.

As best seen in FIG. 1, turntable conveyor 12 includes a stationary frame 14 and a rotatable support 16 that is supported on stationary frame 14 for rotation about a vertical axis V. Stationary frame 14 may be constructed of conventional structural members, such as steel tubular members joined by welding or secured together by fasteners or both, and include support legs 15, as well as stationary lower frame members 14a (FIG. 4). Rotatable support 16 is driven by a first drive system 16a and may be constructed as a circular rotatable base or frame 16b that is rotatably mounted to stationary frame 14. In the illustrated embodiment rotatable base 16b is constructed of curved sidewalls 16c supporting rollers 24 as well as rotatable lower support frame members 16d (FIG. 4). Rotatable support 16 may include a central downwardly depending cylindrical driven member 16e mounted for rotation on a support bar 14b between frame members 14a, where the driven member 16e may be a cylinder or shaft, that is rotationally driven by a force transmitting member 16f, such as in the form of a belt or chain. The force transmitting member 16f is then coupled to the first drive system 16a to rotate the rotatable support 16 on stationary frame 14. Rotatable support 16 is supported for rotation on frame 14 by bearings and may also include a perimeter guard wall that forms an edge guard to protect workers from entanglement with the conveying surface described below.

As noted, rotatable support 16 is driven about vertical axis V by first drive system 16a, which as noted may include a motor (AC or DC), such as an indexing motor or the like, that drives a pulley and force transmitting member 16f disposed about driven member 16e so that the orientation of rotatable support 16 may be changed between two or more orientations about the vertical axis V to align inbound sides and outbound sides of turntable conveyor 12 with conveyors 20, 22, as more fully described below.

Although only two conveyors 20, 22, are illustrated in FIGS. 1-5B and, further, shown in a parallel side-by-side relationship, the conveyors 20, 22 may have their respective conveying directions oriented in a non-parallel orientation with each other. Further, and as will more fully described below, conveyor system 10 may include one or more inbound conveyors (i.e. conveyors conveying an article toward turntable conveyor) and one or more outbound conveyors ((i.e. conveyors conveying an article toward turntable conveyor). So that turntable conveyor 12 can redirect one or more articles from one or more inbound conveyors to one or more outbound conveyors. Moreover, in particular configurations individual conveyors leading to and away from turntable conveyor 12 may operate as both inbound and outbound conveyors.

Figure 5A:
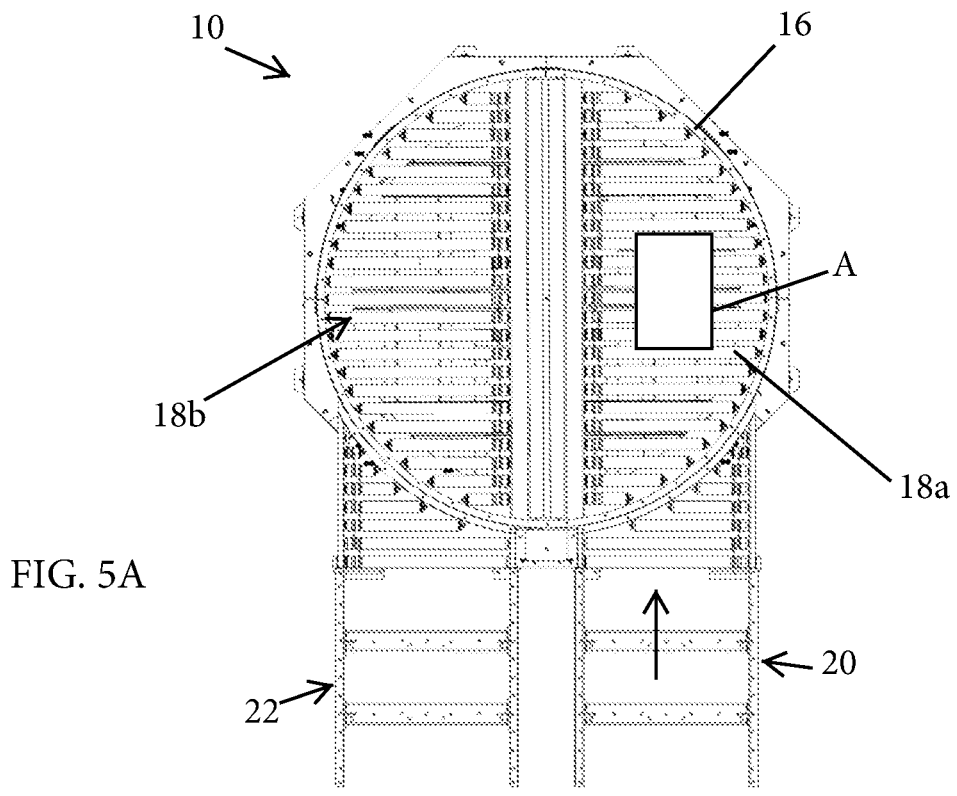
FIGS. 5A-5B disclose a top plan view of the conveying system of FIG. 1 rotating 180 degrees for transfer of an article.
Figure 5B:
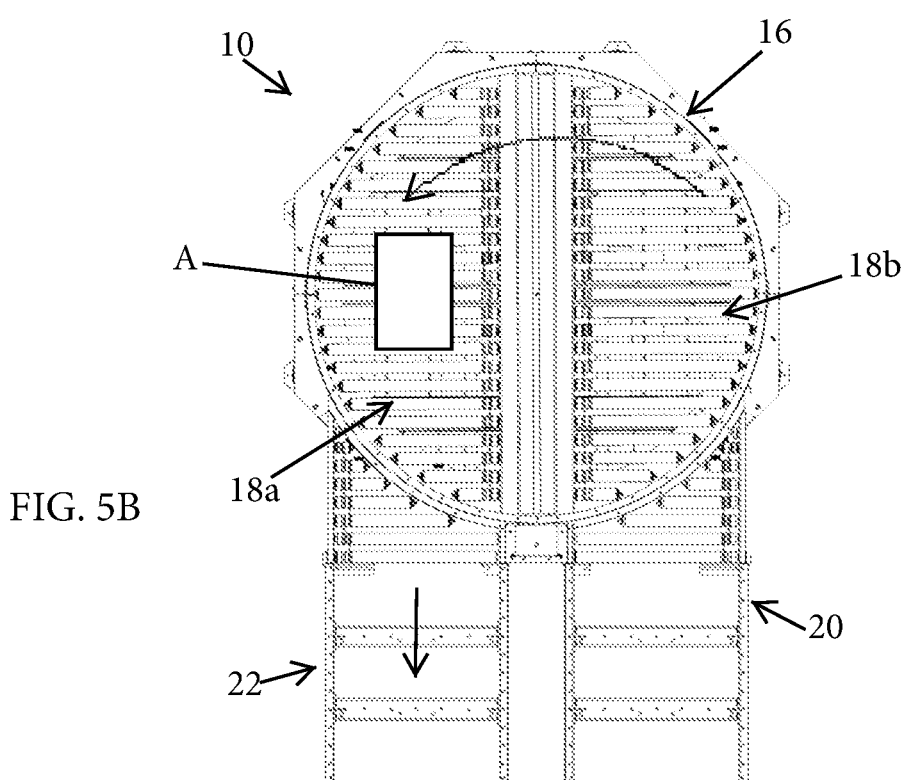

Turntable conveyor 12 includes a conveying surface 18, which is supported on rotatable support 16 and is aligned with the respective conveying surfaces of the two or more conveyors 20, 22. Conveying surface 18 is divided into first and second conveying surface portions or halves 18a, 18b that, as discussed in more detail below, are formed by rollers that may be driven by one or more drivers 19 (referred herein as the second drive system). Thus, when rotatable support 16 of turntable conveyor 12 is driven to a first orientation and conveying surface 18a is aligned with first conveyor 20, such as shown in FIG. 5A, an article A conveyed on first conveyor 20 will be conveyed and transferred onto the conveying surface 18a of turntable conveyor 12. When conveying surface 18a is then driven, the article A will be conveyed at least initially partially across the conveying surface 18a of turntable conveyor 12. Depending on the arrangement, the article A may be simply transferred across conveying surface 18a of turntable conveyor 12 to another conveyor (not shown) that is in line with the first conveyor 20 (but on the opposed side of turntable conveyor 12 from conveyor 20) so that turntable acts as a pass through conveyor. Alternately, as shown in FIG. 5B and also described further below, turntable conveyor 12 can rotate and redirect the article to second conveyor 22 whose conveying direction is not in line with conveying direction of conveyor 20. Therefore, the article on conveying surface 18a may be stopped or slowed so that rotatable support 16 may be rotated to a second orientation where the conveying surface 18a and article supported thereon now aligns with the second conveyor 22.

In the illustrated embodiment, second conveyor 22 may be adjacent and parallel to the first conveyor (as shown) but conveys articles in an outbound direction (away from turntable conveyor 12). Alternately, second conveyor 22 may be located so that its conveying direction is non-parallel and angled to first conveyor's conveying direction.

Rather than stopping conveying surface 18, the driving of conveying surface 18 may be timed so that it is only slowed and to allow the rotatable support 16 to be reoriented to its second position before the article fully traverses the conveying surface 18. As noted it may be stopped instead, and then started when rotatable support 16 is rotated to its second orientation where the conveying direction of the conveying surface 18 is now aligned with the conveying (outbound) direction of the second conveyor 22.

Stated another way, the conveying surface 18 of turntable conveyor 12 may form an inbound direction for receiving an article from a first conveyor when the rotatable support is in a first orientation and may form an outbound direction for conveying the article supported thereon to a second conveyor when said rotatable support is rotated to a second orientation.

Figures 6A, 6B, 6C:
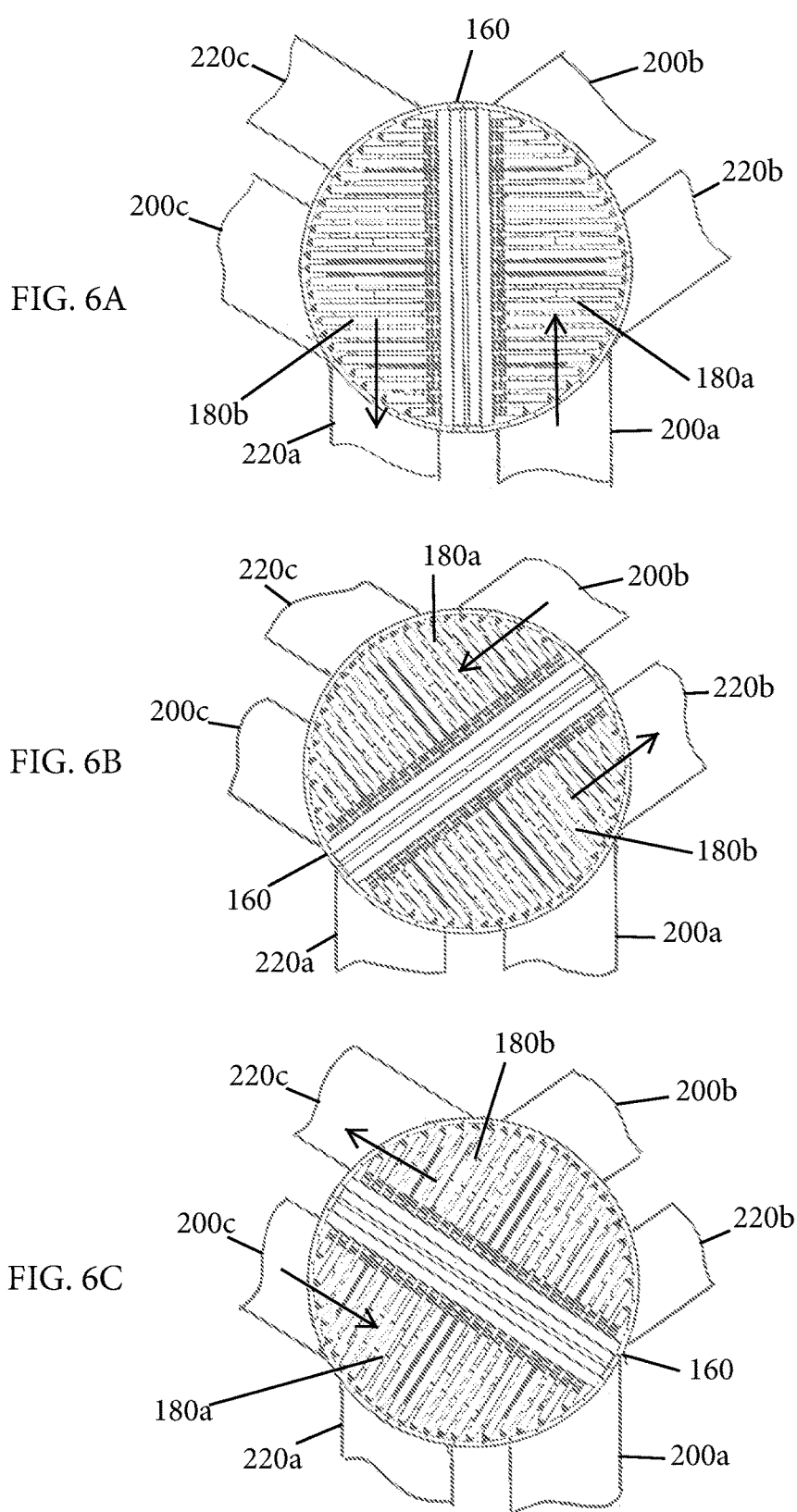
FIGS. 6A-6C illustrate portions of an alternative conveying system configured with multiple inbound and outbound conveyors.

As noted above, and discussed in more detail regarding FIGS. 6A-6C, the conveying surface 18 of turntable conveyor 12 may be rotated by the first drive system 16a to various orientations, such as a third orientation, which may form a second inbound direction for receiving an article from a third conveyor or form a second outbound direction for conveying the article supported thereon to a third conveyor.

In another embodiment, the conveying surface 18 of turntable conveyor 12 may be rotated by the first drive system 16a to fourth, fifth, and sixth orientations, with each orientation forming another inbound or outbound direction for receiving an article from or conveying an article to fourth, fifth and sixth conveyors. It should thus be appreciated that the rotatable support 16 may be turned to a desired angle and articles released to any of a number of output lanes that may be spaced at any angle, with the limitations being the width of the inbound and outbound conveyors and the diameter of the rotatable support 16. The rotation may be based on a preset or established index or angularly controlled, such as by an encoder.

In the illustrated embodiment, the conveying surface 18 of the turntable conveyor 12 comprises a plurality of rollers 24, where the rollers 24 are motorized driven rollers that are powered for rotation by driver 19 that is mounted for rotation with rotatable support 16. Optionally as shown, the rollers 24 may be arranged into first and second sets of rollers 28, 30 for the respective conveying surface portions 18a, 18b, with each set of rollers being driven in opposite directions from each other. That is, one or more flexible drive belts 19a, 19b are looped around and disposed within grooves of each of the rollers of the given set of rollers 28, 30 such that they rotate together when driven by drive 19. The drive 19 may be an electric motor with a rotational output that drives the flexible belts associated with the sets of rollers 28, 30. In the illustrated embodiment each conveyor portion 18a, 18b includes twenty-three rollers 24 of varying length. It should be appreciated that more or fewer such rollers may be employed with alternative embodiments depending on the size of the rotatable support 16.

When the rotatable support 16 is in its first orientation of FIG. 5A, the first set of rollers 28 of portion 18a form the inbound direction to receive the article from conveyor 20. In this orientation, the second set of rollers 30 of portion 18b are driven to provide an outbound direction so that whatever article is supported on the second set of rollers 30 will be conveyed to conveyor 22. After the first set of rollers 28 receives at least one article (and the second set of rollers conveys the article support thereon to conveyor 22), the rotatable support 16 may then be rotated to its second orientation (FIG. 5B) wherein the first set of rollers 28 now are in an outbound direction to convey the article A supported thereon to conveyor 22. At the same time, the second set of rollers 30 now form an inbound direction so that they can now receive an article A from conveyor 20. After both have received and/or conveyed their respective articles, the rotatable support 16 can then be rotated to another orientation, or back to its first orientation to repeat the process. A similar process may be used when rotatable support 16 is moved to the other intermediate orientations noted above. The motorized driven rollers are provided by Dematic Corp. Although the rollers 24 discussed above are rotated by drive belts 19a, 19b, in an alternative configuration motorized driven rollers may have internal drive motors, such as by rollers configured as disclosed in U.S. Pat. No. 8,364,307, which is incorporated herein by reference. Each of the sets of rollers 28, 30 may be configured to rotate in one direction that is opposite from the rotation of the other set of rollers 28, 30, or alternatively the sets of rollers 28, 30 may be driven for rotation in both directions, either separately or together.

The first and second set of rollers 28, 30 may be driven in opposite directions by a single drive system 19 or multiple drivers, for example as noted each roller may be a powered roller. In either case, the drive systems of the conveying surface (including individual drivers in case of the powered rollers) and of the rotatable support may be controlled by a control system. Optionally, the control system may include sensors to detect when the article is received or conveyed by the respective set of rollers to control the rotation of the rotatable support. A suitable control system may include one or more microcontrollers, memory, sensors, and software to control the rotation or the rotatable support and the direction and speed of the drivers that drive the rollers.

However, it should be understood that the conveying surfaces may be different. For example, the conveying surfaces of the turntable conveyor 12 may be rollers 24 as noted, while one or both of the other conveyors 20, 22 (for example) may be belted conveyors.

Figures 2, 3:
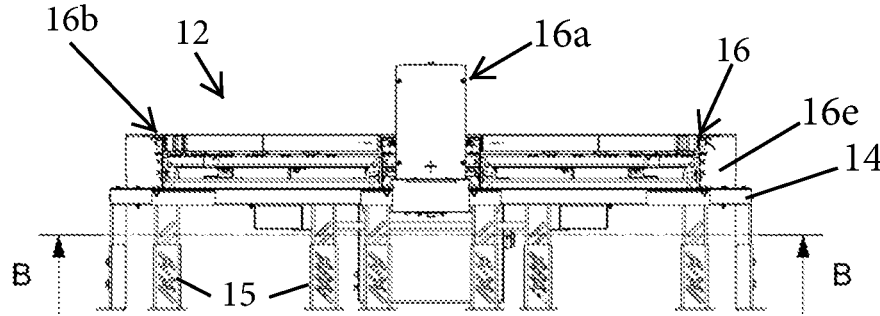
FIG. 2 is top plan view of the conveying system of FIG. 1.
FIG. 3 is a cross-section view taken along line A-A of FIG. 2.

To provide a transition between the respective conveying surfaces, especially when they are mixed types of conveying surfaces, conveying system 10 may include transition rollers 32 and 34 on one or both the inbound side of turntable conveyor 12 and the outbound side of turntable conveyor 12. For example, the transition rollers 32 and 34 may be mounted to the stationary frame and sized so that they closely follow and are immediately adjacent the circular outer perimeter wall of the rotatable support 16, as shown in FIGS. 1 and 2. In this manner no modifications need to be made to existing conveyors when used with turntable conveyor 12. These transition rollers may be powered or not.

Referring now to FIGS. 6A-6C, a portion of a rotatable support 160 is illustrated having motorized rollers defining a conveying surface that is divided into conveying surface portions 180*a*, 180*b* comprising respective separate sets of rollers, where in the illustrated embodiment the rollers of conveying surface 180*a* rotate in an opposite rotational direction from the rollers of conveying surface 180*b*. As also illustrated, multiple conveyors 200*a*, 200*b*, 200*c* and 220*a*, 220*b*, 220*c* are disposed about rotatable support 160. It should be appreciated that rotatable support 160 may be rotated to selectively align conveying portions 180*a*, 180*b* with selective ones of the conveyors 200*a*, 200*b*, 200*c* and 220*a*, 220*b*, 220*c* whereby incoming articles may be received from one such conveyor and discharged to another.

In FIG. 6A, conveying surface 180*a* is shown as being in an orientation for receiving an article from conveyor 200*a* and conveying surface 180*b* is shown as being in an orientation for discharging an article to conveyor 220*a*. It should be appreciated that rotatable support 160 may be rotated 180 degrees whereby conveying surface 180*b* would be in an orientation for receiving an article from conveyor 200*a* and conveying surface 180*a* would be in an orientation for discharging an article to conveyor 220*a*. Still further, rotatable support 160 may be selectively rotated whereby each of the conveying surfaces 180*a*, 180*b* may be oriented for receiving or discharging articles to any of conveyors 200*a*, 200*b*, 200*c* and 220*a*, 220*b*, 220*c*, as partially illustrated in FIGS. 6B and 6C.

Accordingly, the present invention provides a conveyor for redirecting articles from one or more inbound conveyors to one or more outbound conveyors.

Changes and modifications in the specifically described embodiments can be carried out without departing from the principles of the present invention which is intended to be limited only by the scope of the appended claims, as interpreted according to the principles of patent law including the doctrine of equivalents.

We claim:

1. A turntable conveyor for conveying articles, said conveyor comprising:

a stationary frame;

a rotatable support supported on said stationary frame;

a first drive system operable to rotate said rotatable support about a vertical axis relative to said stationary frame between at least a first orientation and a second orientation;

a conveying surface supported on said rotatable support, said conveying surface configured to convey the articles supported thereon in a conveying direction when driven;

a second drive system operable to drive said conveying surface; and said conveying surface forming an inbound direction for receiving an article from a first conveyor when said rotatable support is rotated to the first orientation and forming an outbound direction for conveying the article supported thereon to a second conveyor when said rotatable support is rotated to the second orientation;

wherein said conveying surface comprises a plurality of driven rollers, and wherein said plurality of rollers includes first and second sets of rollers, said first set of rollers forming inbound rollers when said rotatable support is in said first orientation, and said first set of rollers forming outbound rollers when said rotatable support is in said second orientation.

2. The turntable conveyor according to claim 1, wherein said first drive system is operable to rotate said rotatable support to a plurality of orientations to form at least one of a plurality of outbound directions or a plurality of inbound directions.

3. The turntable conveyor of claim 1, wherein the rollers are driven by a drive system supported on the turntable conveyor.

4. The turntable conveyor of claim 1, wherein the conveying surface comprises a circular conveying surface.

5. The turntable conveyor of claim 4, wherein said conveying surface comprises a first conveying surface portion and a second conveying surface portion, wherein the first conveying surface portion is formed by said first set of rollers and the second conveying surface portion is formed by said second set of rollers.

6. The turntable conveyor of claim 1, wherein said first and second sets of rollers are driven in opposite directions by said second drive system.

7. The turntable conveyor of claim 1, wherein the first and second sets of rollers are separated along an axis that is perpendicular to the rotational axes of the first and second sets of rollers.

8. The turntable conveyor of claim 6, wherein said second set of rollers form inbound rollers when said rotatable support is in said second orientation while said first set of rollers form said outbound direction.

9. A conveyor system comprising:

a turntable conveyor comprising;

a stationary frame;

a rotatable support supported on said stationary frame;

a first drive system operable to rotate said rotatable support about a vertical axis relative to said stationary frame between at least a first orientation and a second orientation;

a conveying surface supported on said rotatable support, said conveying surface configured to convey the articles supported thereon in a conveying direction when driven;

a second drive system operable to drive said conveying surface;

a plurality of conveyors adjacent to said turntable conveyor and comprising at least one inbound conveyor operable to convey articles to said conveying surface and at least one outbound conveyor operable to receive an article from said conveying surface;

wherein said conveying surface forms an inbound direction for receiving an article from one of the at least one inbound conveyors when the conveying surface is rotated into alignment therewith, and wherein said conveying surface forms an outbound direction for conveying the article supported thereon to one of the at least one outbound conveyors when the conveying surface is rotated into alignment therewith;

wherein the conveying surface comprises a plurality of rollers that are rotationally driven, and wherein the rollers comprise a first set of rollers defining a first rotational surface and a second set of rollers defining a second rotational surface, and wherein the first set of rollers are rotationally driven in an opposite rotational direction from the second set of rollers.

10. The conveyor system of claim 9, wherein the conveying surface is circular and wherein the conveyors are disposed about a circumference of the conveying surface.

11. The conveyor system of claim 9, wherein the rollers are driven by a drive system supported on the turntable conveyor.

12. The conveyor system of claim 9, wherein in a first orientation of the conveying surface the at least one inbound conveyor is aligned with the first set of rollers for receiving an article from the inbound conveyor onto the first rotational surface, and wherein in a rotated second orientation of the conveying surface the first set of rollers is aligned with the at least one outbound conveyor for conveying the article from the first rotational surface to the outbound conveyor.

13. The conveyor system of claim 12, wherein the conveying surface is rotatable into a third orientation in which the at least one inbound conveyor is aligned with the second set of rollers for receiving another article from the inbound conveyor onto the second rotational surface, and wherein in a rotated fourth orientation of the conveying surface the second set of rollers is aligned with the at least one outbound conveyor for conveying the another article from the second rotations surface to the outbound conveyor.

14. The conveyor system of claim 1, wherein the at least one outbound conveyor comprises a plurality of outbound conveyors, and wherein in a first orientation of the conveying surface the at least one inbound conveyor is aligned with the first set of rollers for receiving an article from the inbound conveyor onto the first rotational surface, and wherein the conveying surface is rotatable such that the first set of rollers is alignable with multiple ones of the outbound conveyors for selectively conveying the article to a selected one of the outbound conveyors.

15. The conveyor system of claim 14, wherein the at least one inbound conveyor comprises a plurality of inbound conveyors, and wherein the first set of rollers and the second set of rollers are selectively rotatably alignable with the inbound conveyors for receiving an article and are selectively rotatably alignable with the outbound conveyor for discharging the article to a selected one of the outbound conveyors.

16. A conveyor system comprising:
a turntable conveyor comprising;
    a stationary frame;
    a rotatable support supported on said stationary frame;
    a first drive system operable to rotate said rotatable support about a vertical axis;
    a circular conveying surface supported on said rotatable support, said conveying surface configured to convey the articles supported thereon in a conveying direction when driven;

a plurality of inbound conveyors adjacent to the turntable conveyor and a plurality of outbound conveyors adjacent to the turntable;
wherein the conveying surface comprises a plurality of rollers that are rotationally driven, and wherein the rollers comprise a first set of rollers defining a first rotational surface and a second set of rollers defining a second rotational surface, wherein the first and second sets of rollers are separated along an axis that is perpendicular to the rotational axes of the first and second sets of rollers, and wherein the conveying surface is configured to receive an article from a selected one of the inbound conveyors and to discharge the article to a selected one of the outbound conveyors.

17. The conveyor system of claim 16, wherein the first set of rollers are rotationally driven in an opposite rotational direction from the second set of rollers.

18. The conveyor system of claim 17, wherein the rollers are driven by a drive system supported on the turntable conveyor.

19. The conveyor system of claim 16, wherein the conveying surface is rotatable such that the first set of rollers are selectively alignable with individual ones of the inbound conveyors for receiving an article from the selected inbound conveyor aligned with the first set of rollers and subsequently rotatable such that the first set of rollers are selectively alignable with individual ones of the outbound conveyors for conveying the article from the first set of rollers to the selected outbound conveyor aligned with the first set of rollers.

20. The conveyor system of claim 19, wherein the conveying surface is rotatable such that the second set of rollers are selectively alignable with individual ones of the inbound conveyors for receiving an article from the selected inbound conveyor aligned with the second set of rollers and subsequently rotatable such that the first set of rollers are selectively alignable with individual ones of the outbound conveyors for conveying the article from the first set of rollers to the selected outbound conveyor aligned with the second set of rollers.

* * * * *